C. H. RECKEFUS.
TEDDER ATTACHMENT FOR MOWING MACHINES.
APPLICATION FILED NOV. 23, 1910.
1,002,451.
Patented Sept. 5, 1911.
2 SHEETS—SHEET 1.
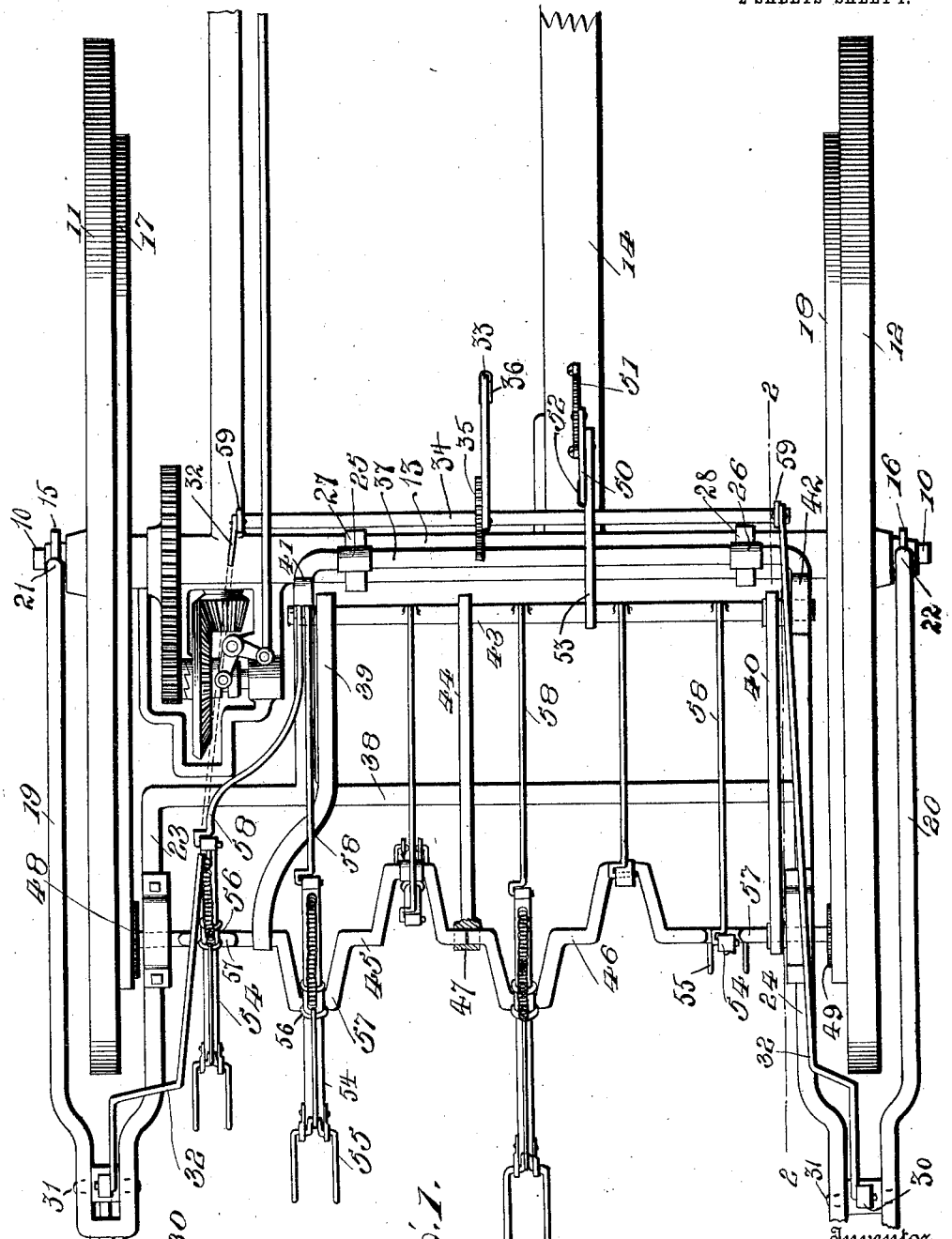

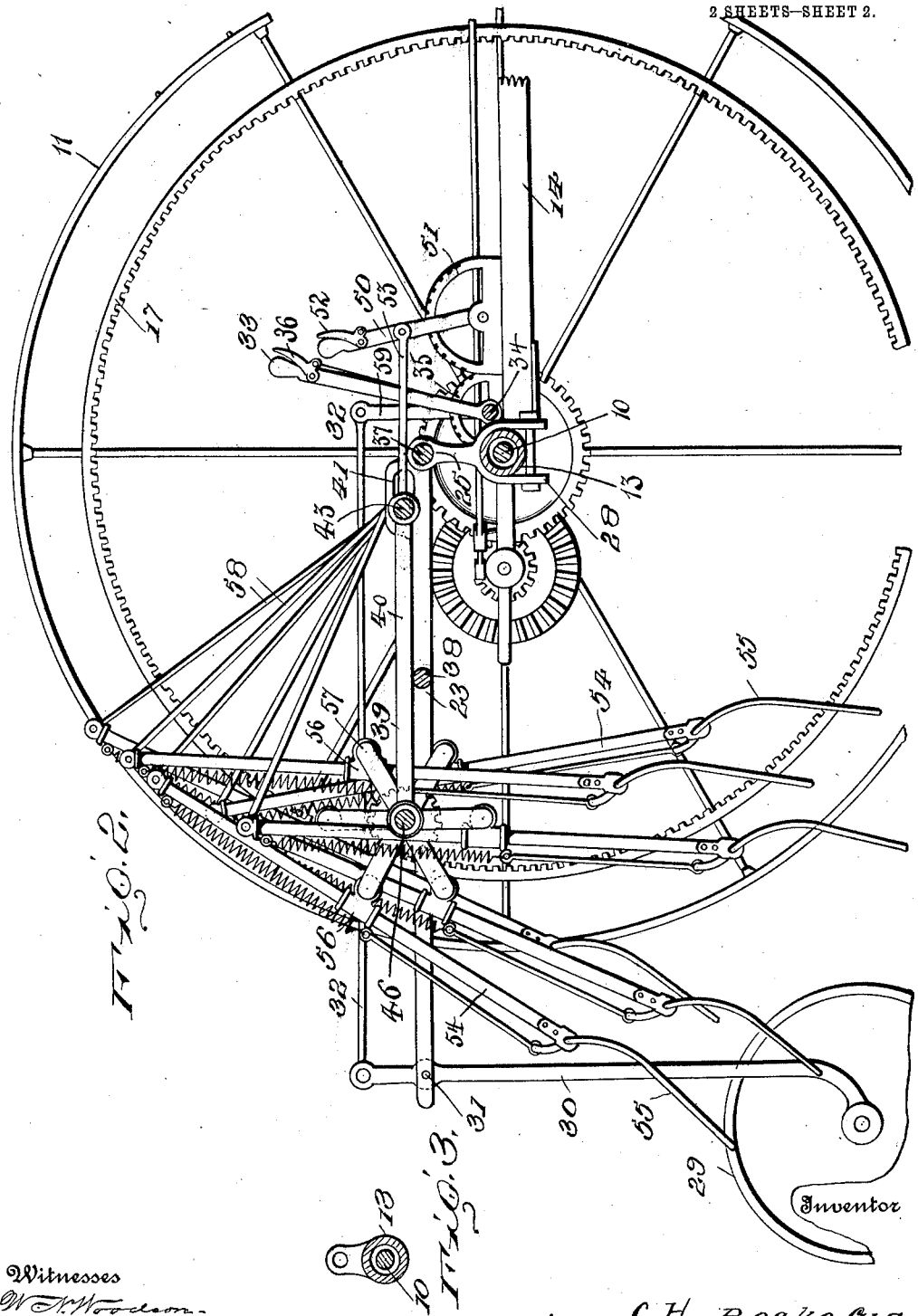

UNITED STATES PATENT OFFICE.

CHARLES H. RECKEFUS, OF PORT DEPOSIT, MARYLAND.

TEDDER ATTACHMENT FOR MOWING-MACHINES.

1,002,451.   Specification of Letters Patent.   Patented Sept. 5, 1911.

Application filed November 23, 1910. Serial No. 593,913.

*To all whom it may concern:*

Be it known that I, CHARLES H. RECKEFUS, citizen of the United States, residing at Port Deposit, in the county of Cecil and State of Maryland, have invented certain new and useful Improvements in Tedder Attachments for Mowing-Machines, of which the following is a specification.

This invention relates to improvements in hay tedder attachments to mowing machines, and has for one of its objects to simplify and improve the construction and increase the efficiency and utility of devices of this character.

Another object of the invention is to provide a device of this character which may be applied without material structural changes to any of the various forms of mowing machines in common use, and without structural change of any kind in the mower.

Another object of the invention is to provide a device of this character which may be readily coupled to and uncoupled from the mowing machine operating mechanism.

Another object of the invention is to provide a device of this character in two parts arranged to be independently operated from the ground wheels at each end of the mower.

With these and other objects in view the invention consists in certain novel features of construction as hereinafter shown and described and then specifically pointed out in the claims.

The improved device may be applied without material structural changes to any of the various forms of mowing machines in common use, and for the purpose of illustration is shown applied to a conventional machine of this character, and in the drawings thus employed, Figure 1 is a plan view of the improved device applied; Fig. 2 is a section on the line 2—2 of Fig. 1; Fig. 3 is a detail view, illustrating the manner of applying the improved device to new machines.

Corresponding and like parts are referred to in the following description and indicated in all the views of the drawings by the same reference characters.

The ordinary mowing machine comprises an axle 10 having ground wheels 11—12 connected thereto at the ends and provided with the usual ratchet connections, not shown, and surrounded between the hubs of the wheels with the usual sleeve or axle housing 13, the tongue 14 being coupled to the axle sleeve in the usual manner, as shown. The axles 10 of mowing machines are usually provided at their outer ends and externally of the hubs of the wheels with disks 15—16, and these disks are utilized in the improved structure to support portions of the mechanism, as hereinafter explained. The wheels 11—12 are provided respectively with internal gears 17—18 whereby the requisite motion is imparted to the tedder mechanism.

The frame work for supporting the tedder mechanism is preferably formed from a single piece of material bent into the required shape and comprising outer members 19—20 connected at one end at 21—22 to the disks 15—16 and thence directed inwardly between the wheels at 23—24 and connected at 25—26 to clips 27—28 which are coupled to the housing 13. At their rear ends the frame members 19—23 and 20—24 are provided respectively with caster wheels, and as the caster wheels and their operating mechanism are precisely alike, the description of one will suffice for both. The wheels are indicated by the character 29 and mounted in the forked end of a standard 30, the latter being pivoted at 31 to the frame members and extends above the same. At its upper end each standard is connected to an operating rod 32, the rods being in turn each connected to an operating lever arm 59 carried by a rock shaft 34 mounted for oscillation upon the frame 14. Attached to the shaft 34 is a lever arm 33 which operates over a notched segment 35 which is in turn arranged to be engaged by a pawl 36 of the usual construction. By this arrangement the caster wheels may be simultaneously adjusted to elevate and depress them relative to the axle.

At their rear ends the frame members 23—24 are connected by a transverse member 37, to which the clips are connected, and likewise coupled by another brace member 38 located rearwardly of the member 37. Resting upon the member 38 near its ends are two arms 39—40, the rear ends of the members 23—24 being slotted, as shown at 41—42. Extending through the slots 41—42 and slidable therein is a shaft like member 43, and connected to the member 43 and extending rearwardly thereof is an arm 44. Bearing over the frame member 23 is a crank shaft 45, while a similar crank shaft 46 bears upon the frame member 24 with the inner ends of the two crank shafts mounted for rotation in a double bearing 47 on the arm 44. The shaft 45 is provided with a pinion 48 operating in connection with the internal gear 17, while a similar pinion 49 operates in connection with the internal gear 18. By this means the crank shafts are independently rotatable and supported upon the frame members 23—24. The arms 39—40—44 all rest upon the transverse member 38 and are supported thereby. It will be noted that the arm 44 is connected to the transverse member 43, which operates slidably in the slots 41—42 so that the crank shafts, together with their pinions, may be moved rearwardly within the range of the slots to disconnect the pinions from the gears, as hereafter explained.

Any suitable means may be employed for actuating the member 43 and its attachments, but an approved operating means is shown and consists of a lever 50 operated over a notched segment 51 and provided with a pawl 52, the lever being coupled to the member 43 by a connecting rod 53. The levers 33—50 are extended to points convenient to the hand of the operator upon the machine, who can thus control the movements of the tedder devices.

The tedder devices comprise the usual levers 54 having forks 55 at their lower ends and coupled at 56 to the cranks 57 of the shafts 45—46 and connected at their upper ends by rods 58 to the member 43. By this arrangement it will be obvious that when the mowing machine is moved forwardly the motion of the ground wheels 11—12 will be communicated to the crank shafts and thence to the teddering devices when the crank shafts are in their rearward position, and when the crank shafts are drawn forwardly by actuating the lever 50, the teddering mechanism will be uncoupled from the operating wheels. By this means the operations of the teddering mechanism are under the control of the driver. By arranging the teddering mechanism in two portions and operatively connecting the portions to the shafts 45—46, the machine is not disarranged when turning corners or in reversing the position of the machine.

When the improved device is to be applied to machines already in use, the clip devices 27—28 will be employed, and modified to suit the different sizes and forms of the axle housing, but when the improved apparatus is applied to new machines the housing 13 will be provided with perforated lugs or other devices to receive the connecting means of the member 37, as illustrated in Fig. 3, but this would not constitute a departure from the principle of the invention.

Having thus described my invention, what is claimed as new is:

1. The combination with an axle and ground wheels, said ground wheels carrying gear wheels, of a supporting frame mounted to swing upon said axle, a bar slidably engaging said frame, a crank shaft, coupling members between said crank shaft and said slidable bar, tedder fork devices connected to said crank shaft, rods connecting said tedder fork devices to said slidable bar, pinion carried by said crank shaft and engaging one of said gear wheels when the crank shaft is in one position, and means for moving said bar to connect and disconnect said pinion.

2. The combination with an axle and ground wheels, said ground wheels each carrying a gear wheel, of a supporting frame mounted to swing upon said axle, a bar slidably engaging said frame, two crank shafts arranged in alinement transversely of said frame, coupling members between said crank shafts and said slidable bar, one of said coupling members operating to support the inner ends of the crank shafts, tedder fork devices connected to said crank shafts, rods connecting said tedder fork devices to said slidable bar, a pinion carried by each of said crank shafts and engaging respectively with said gear wheels when the crank shafts are in one position, and means for moving said bar to simultaneously connect and disconnect said pinions.

3. The combination with a mowing machine including the ground wheels and frame work, gear wheels carried by the ground wheels, a supporting frame, means for connecting said supporting frame to said frame work, two sets of guide devices carried by said supporting frame, a forward bar slidable in one set of said guide devices, crank shafts sliding through the other set of said guide devices, frame members coupling said crank shafts and bar, tedder fork devices connected to said crank shafts, rods connected to said fork devices and to said forward bar, gear pinions carried by said crank shafts and engaging when the shafts are in one position with the gear wheels, and means for adjusting said crank shafts and their connected frame members within the guideways to connect and disconnect the pinions relative to the gear wheels.

In testimony whereof, I affix my signature in presence of two witnesses.

CHARLES H. RECKEFUS. [L. s.]

Witnesses:
GEO. H. COBOURN,
BLANCHE STEBBING.